United States Patent
Goodwin

(10) Patent No.: US 10,227,698 B2
(45) Date of Patent: Mar. 12, 2019

(54) GALVANIC ANODE AND METHOD OF CORROSION PROTECTION

(71) Applicant: Construction Research & Technology, GmbH, Trostberg (DE)

(72) Inventor: Frederick R. Goodwin, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 73 days.

(21) Appl. No.: 14/418,024

(22) PCT Filed: Jul. 18, 2013

(86) PCT No.: PCT/EP2013/065179
§ 371 (c)(1),
(2) Date: Jan. 28, 2015

(87) PCT Pub. No.: WO2014/019863
PCT Pub. Date: Feb. 6, 2014

(65) Prior Publication Data
US 2015/0167178 A1 Jun. 18, 2015

Related U.S. Application Data

(60) Provisional application No. 61/677,164, filed on Jul. 30, 2012.

(51) Int. Cl.
*C23F 13/02* (2006.01)
*C23F 13/10* (2006.01)
(Continued)

(52) U.S. Cl.
CPC .............. *C23F 13/10* (2013.01); *C23F 13/06* (2013.01); *C23F 13/14* (2013.01);
(Continued)

(58) Field of Classification Search
CPC ...... C23F 2201/02; C23F 13/02; C23F 13/06; C23F 13/08; C23F 13/10; C23F 13/12;
(Continued)

(56) References Cited

U.S. PATENT DOCUMENTS 3,441,491 A 4/1969 George
3,969,195 A * 7/1976 Dotzer .................... C10M 7/00
205/103

(Continued)

FOREIGN PATENT DOCUMENTS

CA 2316983 C 1/2007
CA 2765153 12/2010
(Continued)

OTHER PUBLICATIONS

Pennisi (Coating Fabrication, 2001, http://www.coatfab.com/anodising.htm).*
(Continued)

*Primary Examiner* — Alexander W Keeling
(74) *Attorney, Agent, or Firm* — Curatolo Sidoti Co., LPA; Joseph G. Curatolo; Salvatore A. Sidoti

(57) ABSTRACT

A hybrid sacrificial galvanic anode, an anodic system including the hybrid sacrificial anode, and a method of cathodically protecting steel reinforcement in concrete structures is provided. The hybrid anode provides initial steel polarization followed by long term galvanic protection without the use of batteries or external power supplies.

14 Claims, 4 Drawing Sheets

(51) Int. Cl.
*C23F 13/06* (2006.01)
*C23F 13/14* (2006.01)
*C04B 111/26* (2006.01)

(52) U.S. Cl.
CPC ..... *C04B 2111/265* (2013.01); *C23F 2201/02* (2013.01); *C23F 2213/22* (2013.01)

(58) Field of Classification Search
CPC .......... C23F 13/14; C23F 13/16; C23F 13/18; C23F 13/20; C23F 2213/21; C23F 2213/22; C04B 2111/265
See application file for complete search history.

(56) References Cited

U.S. PATENT DOCUMENTS

| | | | |
|---|---|---|---|
| 5,102,514 A * | 4/1992 | McCready | C23F 13/02 204/196.05 |
| 5,449,563 A | 9/1995 | Zhang | |
| 5,968,339 A | 10/1999 | Clear | |
| 6,022,469 A | 2/2000 | Page | |
| 6,193,857 B1 | 2/2001 | Davison et al. | |
| 6,303,017 B1 | 10/2001 | Page et al. | |
| 6,461,082 B1 | 10/2002 | Smith | |
| 7,402,233 B1 | 7/2008 | Morgan | |
| RE40,672 E | 3/2009 | Whitmore | |
| 2002/0023848 A1* | 2/2002 | Whitmore | C23F 13/16 205/734 |
| 2004/0011669 A1* | 1/2004 | Glass | C23F 13/16 205/766 |
| 2004/0238347 A1* | 12/2004 | Bennett | C23F 13/02 204/196.01 |
| 2006/0154097 A1* | 7/2006 | Amano | C09J 133/04 428/520 |
| 2007/0194774 A1* | 8/2007 | Bennett | C23F 13/02 324/71.2 |
| 2010/0044218 A1 | 2/2010 | Funahashi | |
| 2010/0147703 A1* | 6/2010 | Glass | C23F 13/06 205/732 |
| 2010/0270169 A1 | 10/2010 | Howard et al. | |

FOREIGN PATENT DOCUMENTS

| | | | |
|---|---|---|---|
| CN | 201 372 311 Y | 12/2009 | |
| EP | 0615002 A1 * | 9/1994 | ............. C23F 13/14 |
| GB | 1 379 832 A | 1/1975 | |
| JP | S41-14683 | 7/1966 | |
| JP | H08511581 | 12/1996 | |
| JP | 2002220685 A | 8/2002 | |
| JP | 2002528647 A | 9/2002 | |
| JP | 2002536544 A | 10/2002 | |
| JP | 2009097049 A | 5/2009 | |
| WO | WO 02/16670 A2 | 2/2002 | |

OTHER PUBLICATIONS

PCT/EP2013/065990—International Search Report, dated Dec. 17, 2013.
PCT/EP2013/065990—International Written Opinion, dated Dec. 17, 2013.
PCT/EP2013/065990—International Preliminary Report on Patentability, dated Feb. 3, 2015.
PCT/EP2013/065179—International Search Report, dated Dec. 19, 2013.
PCT/EP2013/065179—International Written Opinion, dated Dec. 19, 2013.
PCT/EP2013/065179—International Preliminary Report on Patentability, dated Feb. 3, 2015.
Office Action for Canadian Patent Application No. 2,880,197; dated Jun. 10, 2016.
Office Action for Japanese Patent Application No. 2015-524710, dated Sep. 19, 2017.
Office Action in Russian Patent Application 2015 103 986.
Office Action in Australian Patent Application 2013298658, dated Sep. 11, 2017.
Office Action in Australian Patent Application 2013298781, dated Oct. 4, 2017.
Office Action for Japanese Application No. 2015-524710, dated Feb. 27, 2017.
Office Action for Canadian Patent Application No. 2,880,197; dated Mar. 22, 2017.

* cited by examiner

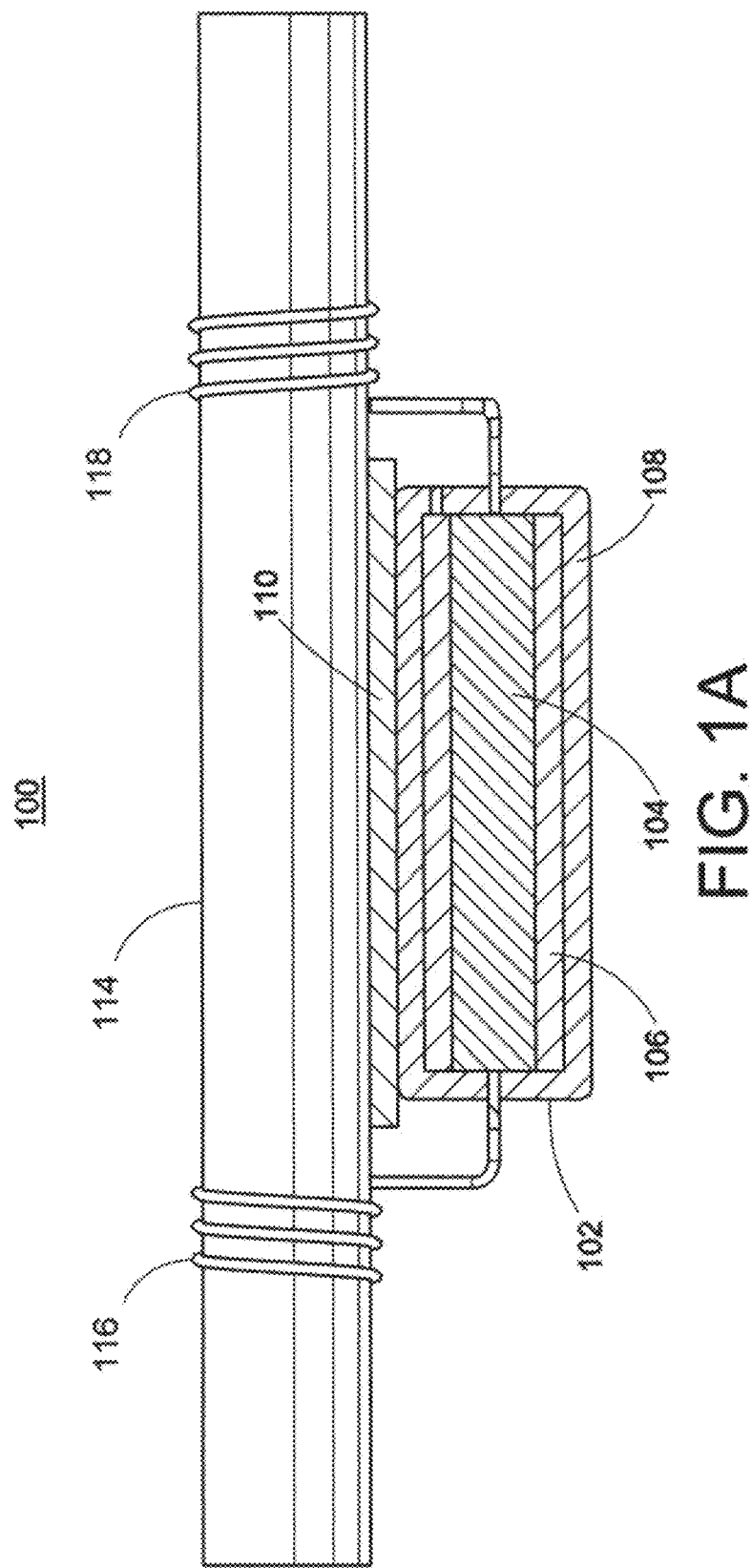

GALVANIC ANODE AND METHOD OF CORROSION PROTECTION

CROSS REFERENCE TO RELATED APPLICATIONS

This application is a national stage application of International Application No. PCT/EP2013/065179, filed 18 Jul. 2013, which claims priority from U.S. Provisional Patent Application No. 61/677,164, filed 30 Jul. 2012, from which applications priority is claimed, and which are incorporated herein by reference.

BACKGROUND

Corrosion has a huge economic and environmental impact on virtually all facets of the world's infrastructure, from highways, bridges and buildings, to oil and gas, chemical processing, and water and wastewater systems. A recent estimate of the worldwide direct cost of corrosion, for prevention as well as repair and replacement, exceeded $1.8 trillion, or 3 to 4 percent of the gross domestic product (GDP) of industrialized countries.

The 2001 U.S. Federal Highway Administration-funded cost of corrosion study, "Corrosion Costs and Preventive Strategies in the United States," determined the annual direct cost of corrosion to be a staggering $276 billion. The study covered a large number of economic sectors, including the transportation infrastructure, electric power industry, conveyance and storage.

The indirect cost of corrosion was conservatively estimated to be equal to the direct cost, giving a total direct plus indirect cost of more than $600 billion or 6 percent of GDP. This cost is considered to be a conservative estimate since only well-documented costs were used in the study. In addition to causing severe damage and threats to public safety, corrosion disrupts operations and requires extensive repair and replacement of failed assets.

The road and bridge infrastructure in the United States is crumbling, with thousands of bridges rated as unsafe and in need of replacement or major repairs. In many of these cases, corrosion plays a significant role in undermining safety. Corrosion protection measures could help stem further problems. Steps are being taken to address America's aging infrastructure. For example, House bill H.R. 1682, the "Bridge Life Extension Act 2009," introduced in March 2009, would require States to submit a plan for the prevention and mitigation of damage caused by corrosion when seeking federal funds to build a new bridge or rehabilitate an existing bridge.

Many reinforced concrete structures suffer from premature degradation. Concrete embedded steel reinforcement is initially protected from corrosion by the development of a stable oxide film on its surface. This film, or passivation layer, is formed by a chemical reaction between the highly alkaline concrete pore water and the steel. The passivity provided by the alkaline conditions may be destroyed by the presence of chloride. The chloride ions locally de-passivate the metal and promote active metal dissolution. Corrosion of the steel is usually negligible until the chloride ions reach a threshold where corrosion initiates. The threshold concentration depends on a number of factors including, for example, the steel microenvironment, the pore solution pH, the interference from other ions in the pore solution, the electrical potential of the reinforcing steel, the oxygen concentration and ionic mobility. The chloride acts as a catalyst in that it does not get consumed in the corrosion reaction but remains active to again participate in the corrosion reaction.

Damage to reinforced concrete structures is caused primarily by the permeation of chloride ions through the concrete to the area surrounding the steel reinforcement. There are a number of sources of chlorides including additions to the concrete mix, such as chloride-containing accelerating admixtures. The chloride may also be present in the structure's environment such as marine conditions or de-icing salts. The presence of chloride does not have a directly adverse effect on the concrete itself but does promote corrosion of the steel reinforcement. The corrosion products that form on the steel reinforcement occupy more space than the steel reinforcement causing pressure to be exerted on the concrete from within. This internal pressure builds over time and eventually leads to cracking and spalling of the concrete. Corrosion of the steel reinforcement also reduces the strength of the reinforcing steel and diminishes the load bearing capacity of the concrete structure.

Other factors besides chloride ion concentration affect the corrosion rate of steel, including pH, oxygen availability, and electrical potential of the steel, as well as resistivity of the surrounding concrete. These factors interact, such that a limitation on one does not necessarily stop corrosion and levels approaching threshold levels of one will synergize with another to allow corrosion. For example, even with a high chloride level if insufficient oxygen is available, corrosion will not occur. As the pH falls, the chloride threshold for corrosion becomes lower. In very high resistivity concrete, not only does carbonation and chloride ingress slow, the corrosion reaction is reduced due to the increased difficulty of ion flow. Temperature is also involved in corrosion activity, just like any other chemical reaction.

Cathodic protection of steel reinforcement in concrete is an accepted method of providing corrosion protection for the metal, especially where chloride ions are present at significant concentrations in the concrete. Cathodic protection involves the formation of a circuit with the reinforcing steel acting as a cathode that is electrically connected to an anode. When a sufficiently large potential difference exists, corrosion of the cathode is reduced or prevented.

It is known to create a potential difference between an anode and a cathode both by means of impressed current cathodic protection and by means of a galvanic cell. Impressed current cathodic protection involves the use of an anode and an applied electrical current employing an external DC power supply or an AC power source and a rectifier. The power supply presents challenges in terms of reliability and costs associated with ongoing power consumption, monitoring and maintenance requirements.

Cathodic protection may also be provided by means of a galvanic cell in which the potential arises as a result of different materials forming a sacrificial anode and a cathode. Sacrificial cathodic protection occurs when a metal is coupled to a more reactive, or more anodic, metal. The anode consists of a sacrificial metal that is capable of providing protective current without the use of a power supply, since the reactions that take place during their use are thermodynamically favored. Disadvantages of sacrificial anode systems include limited available protection current and limited life. Sacrificial anodes are subject to ongoing corrosion, or consumption of the galvanic metal, and generally require replacement at some point depending on the extent of the corrosion.

Because corrosion of steel-reinforced concrete structures presents dangers to human life and is very costly to repair, what is needed are improved systems and methods for meeting the need to implement new anti-corrosion technologies and protect infrastructure for future generations.

BRIEF DESCRIPTION OF THE DRAWINGS

FIG. 1A is a cross sectional view of an illustrative embodiment of the galvanic cathodic protection system.

DETAILED DESCRIPTION

Figure 1B:
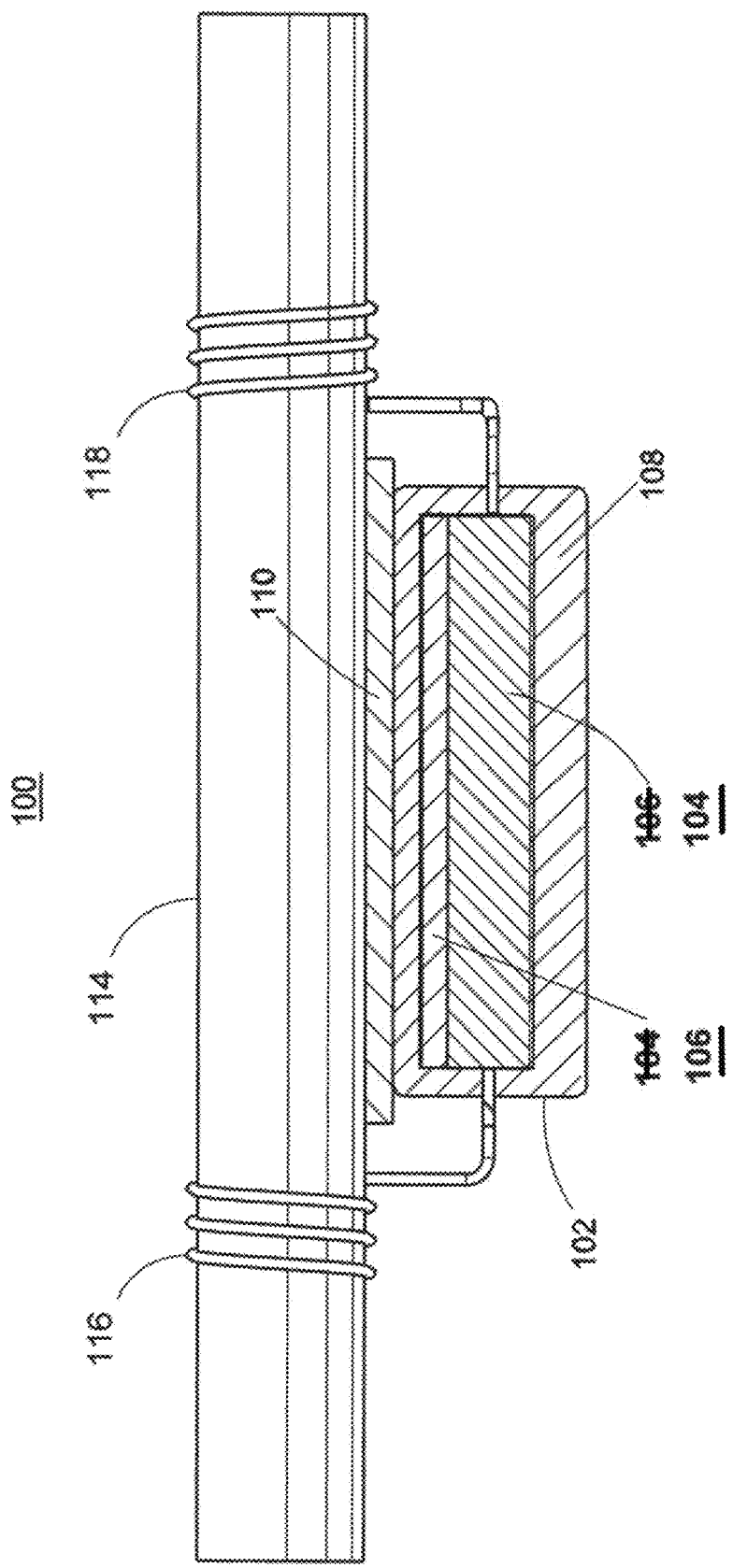
FIG. 1B is a cross sectional view of an illustrative embodiment of the galvanic cathodic protection system.

Provided is a galvanic anode assembly and method for corrosion protection of reinforcing steel in a concrete structure using a system based on principals of cathodic protection of reinforcing steel in concrete structures.

According to certain illustrative embodiments, a sacrificial anode body comprises (a) a first sacrificial metal; (b) a second sacrificial metal, the second sacrificial metal less electrochemically negative than the first sacrificial metal, wherein the first sacrificial metal and said second sacrificial metal are more electrochemically negative than steel; and (c) an encasement material surrounding the first and/or the second sacrificial metals.

According to other embodiments, a sacrificial anode body comprises (a) a first sacrificial metal, said first sacrificial metal more electrochemically negative than steel, (b) a second sacrificial metal, said second sacrificial metal less electrochemically negative than said first sacrificial metal, and (c) an encasement material surrounding said first and/or said second sacrificial metals, wherein said anode body comprises a substantially cylindrical shape having a C-shaped recess extending substantially along the length of one side of the anode body.

According to further embodiments, a system for reducing the corrosion of steel reinforcement in a concrete structure comprises (a) an anode body comprising a first and a second sacrificial metal, the first sacrificial metal is more electrochemically negative than steel, the second sacrificial metal is less electrochemically negative than the first sacrificial metal; (b) the first and second sacrificial metals are at least partially covered with an encasement material; (c) at least one elongated electrical conductor electrically connected to the anode body and emanating from the encasement material; and (d) reinforcing steel connected to the at least one elongated electrical conductor.

According to further illustrative embodiments, a method for reducing the corrosion of steel reinforcement in a concrete structure comprises electrically connecting a sacrificial anode body of at least two sacrificial metals of different materials, each more electrochemically negative than steel, the anode body at least partially covered in an encasement material, to a steel reinforcement in a steel reinforced concrete structure.

In another illustrative embodiment, a method for reducing the corrosion of steel reinforcement in a concrete structure comprises positioning a sacrificial anode body of at least two sacrificial metals of different materials, each more electrochemically negative than steel, the anode body at least partially covered in an encasement material, within cathodic protective proximity of a steel reinforcement in a steel reinforced concrete structure.

Cathodic protection may be applied to control corrosion of steel embedded in reinforced concrete structure. The cathodic protection system of the present disclosure operates to form an electrolytic potential difference between an anode and the steel reinforcement. This difference causes current to flow through an electrical connection and ions to flow through the concrete and/or encasement material sufficient to prevent or reduce corrosion of the steel reinforcing bar while causing corrosion of the anode.

Cathodic protection prevents corrosion of steel reinforcement in concrete by converting the anodic, or active, sites on the metal surface to cathodic, or passive sites. Creating a potential difference between an anode and a cathode by means of impressed current cathodic protection involves the use of a non-sacrificial anode and an applied electric current. An impressed current system requires an electric current generated by an external power supply, wiring and monitoring to ensure that the system remains operable.

Sacrificial cathodic protection may be provided by means of a galvanic cell in which the potential arises as a result of the different materials forming a sacrificial anode and a cathode. The anode body is formed from a sacrificial material which corrodes relative to the steel material without requiring an impressed current. This is referred to as a sacrificial system, since the galvanic anode is sacrificed to protect the structural steel from corrosion. The sacrificial anode is a piece of corrodible metal, electrically connected to the metallic surface to be protected, which is preferentially consumed by electrolytic action.

In certain embodiments, the sacrificial anode assembly of the present disclosure provides locations for anodic reactions to take place in lieu of the reinforcing steel. Therefore, while the galvanic system is in service, the anode, instead of the reinforcing steel, will degrade.

According to aspects of the present disclosure, a galvanic system is provided in which the anode body is formed from at least two sacrificial metals, which corrode relative to steel, without the provision or use of an impressed current. The anode body may be at least partially covered by an encasement material. In some embodiments, elongated metal conductors may be connected to the anode body and emanate from the encasement material to electrically connect the anode body to the reinforcing steel embedded in the concrete.

Oxidation products may deposit on the surface of the sacrificial metal of the anode as it corrodes. If these corrosion products are not removed they will prevent the electrochemical reaction by blocking the flow of ions through the electrolyte, which is known as passivation of the anode. By making the oxidation products soluble, the anode may continue to function as intended. The solubility of the corrosion products is controlled by the encasement material. The encasement material provides a mechanism for removal of the corrosion products from the surface of the sacrificial metals of the anode body, as well as providing an ionic path for ions to flow from the steel reinforcement (the cathode) to the corroding sacrificial metal anode.

Known mechanisms to be used in encasement materials for the removal of the corrosion/oxidation products of the sacrificial metals include pH activation, the use of catalyzing salts combined with humectants and deliquescents, and chelation with polyeletrolytes.

In accordance with certain embodiments, an encasement material may comprise, for example, a porous mortar. Alternatively, the encasement material may comprise an ionically conductive, compressible material, wherein the matrix is sufficiently compressible to absorb the products of corrosion of the sacrificial metal anode. The encasement material may be of a suitable activating chemistry, for example, through halides, chelation or pH, and of sufficient porosity to enable absorption of the products of corrosion, thereby preventing or reducing passivation.

In other embodiments, the encasement material may include humectant, deliquescent and/or hygroscopic materials to absorb sufficient moisture to maintain conductivity around the anode to ensure that sufficient output of current is maintained during the life of the anode and to keep the interface between the anode and cathode (steel reinforcement) electrochemically active.

According to certain illustrative embodiments, a suitable encasement material for the galvanic anode body comprises a mixture of about 75% gypsum, about 20% bentonite clay, and about 5% sodium sulfate. This encasement material provides a uniform environment that reduces self-consumption of the anode. Without being bound to any particular theory, it is thought that the sulfate activates the zinc metal of the anode body and the bentonite clay acts as a humectant.

In further illustrative embodiments, a dual action anode assembly or body is provided in which a more electrochemically active sacrificial metal may establish high initial activity to create an alkaline, chloride-free environment around the attached reinforcing steel. This initial stage of high activity may be followed by longer term protection utilizing the less electrochemically active sacrificial metal following consumption or passivation of the first more electrochemically active metal.

In further embodiments, a first sacrificial metal may be attached to a second less electrochemically active sacrificial metal. The first, more electrochemically active, sacrificial metal may provide an initially higher galvanic current to initiate the anodic reaction. The second, less electrochemically active, sacrificial metal may provide sufficient current to adequately protect the reinforcing steel over a longer period of time. The anode assembly of the present disclosure may comprise combinations of sacrificial metals such as magnesium, zinc, aluminum, alloys thereof, and the like.

In yet further embodiments, the first sacrificial metal may comprise magnesium. The magnesium portion of the anode body reacts rapidly causing an initial polarization intensity and creates an alkaline environment around the steel. This initial polarization forces diffusion of chloride ions away from the steel. As the magnesium portion of the anode body is consumed or otherwise expended, the second sacrificial metal, for example zinc, operates to maintain the passive condition of the reinforcing steel. The system may achieve the benefits of impressed current systems without complex wiring, batteries or external power supplies.

According to certain embodiments, the anode body includes a first sacrificial metal and a second sacrificial metal, where both the first and the second sacrificial metals are more electrochemically active than the steel reinforcement embedded in the concrete structure. The first sacrificial metal is more electrochemically active as compared to the second sacrificial metal. The more electrochemically active first metal or metal alloy (for example, magnesium) is positioned between the less the electrochemically active second metal (for example, zinc) or metal alloy and the steel reinforcement. Under this construction, the oxidation product buildup from the more electrochemically active first metal (if not absorbed or soluble) may further enhance the charge distribution of the corrosion of the second less electrochemically active metal by further insulating the direct conduction path of the second metal to the steel ionic path in a manner similar to the insulating layer or spacer. Thus, the magnesium oxidation products may tend to increase the overall effectiveness of the insulating spacer. The expansive products from the magnesium oxidation also can be relieved between the reinforcing steel and the anode into the compressible adhesive of the insulating spacer rather than generating expansive forces that could result in cracking of the surrounding repair mortar or concrete structure.

According to certain embodiments, the anode assembly may comprise a first perforated, substantially flat sacrificial metal that is rolled into a cylinder or section of a cylinder, and a second perforated, substantially flat sacrificial metal may be similarly shaped and attached to the first metal. A perforated sacrificial metal increases the surface area of the anode material thereby increasing the efficiency of the anode. In other embodiments, the first and/or second sacrificial metals may comprise a solid mass.

In other illustrative embodiments, the anode assembly may comprise an arrangement that is easily positioned to reinforcing steel of various sizes. One side of the anode body may include a longitudinal recess, such as, for example, a generally C-shaped cross-section. This shape conforms well to various diameters, and curvatures, of reinforcing bars, and results in a secure and repeatable mounting of the anode body to the steel. In further embodiments, the anode assembly may comprise other cross-sections such as, for example, a U-shaped, V-shaped, rectangular, or semicircular cross-section.

According to certain aspects of the present disclosure, the first and second anode surface areas are effective to discharge enough current to protect the structure and the anode weight is sufficient to last the desired lifetime when discharging current. The galvanic anode system of the present disclosure is self-regulating based on the incipient corrosion activity of the attached adjacent steel. The corrosion products from the first and/or second sacrificial metals may also act as an electrical or ionic path spacer to optimize charge distribution around the anode.

The corrosion rate depends on temperature, humidity, ionic environment, and conductivity regardless of whether it is corrosion of reinforcing steel or of a sacrificial anode. The material of the sacrificial anode may be chosen to preferentially corrode compared to the steel to provide a protective cathodic charge on the steel. As the corrosion conditions become more favorable, the corrosion rate of the anode increases providing proportionally increased corrosion protection to the steel. In this competing chemical reaction, the preferred reaction may prevent the second from occurring by an induced electrical charge.

In other embodiments, the sacrificial anode assembly may be attached to the reinforcing steel using a spacer. In further embodiments, the spacer may comprise a polymeric spacer. In still further embodiments, a spacer may comprise an insulative adhesive polymer spacer, for example and without limitation, pressure sensitive double-sided tape, butyl rope caulk, silicon putties, moldable adhesive, or the like. Double-sided tape is any pressure sensitive tape that is coated with adhesive on both sides. The insulative adhesive spacer may facilitate the positioning of the anode while the elongated electrical connectors (eg, metal tie wires) are secured to the steel reinforcement. The insulative adhesive spacer may be capable of providing both electrical and ionic insulation and may also act as an electrical or ionic path spacer to optimize charge distribution around the anode. In further embodiments, the spacer may comprise a double-sided adhesive foam tape. The foam tape may provide for absorption of corrosion products, for example, rapidly forming corrosion products from magnesium corrosion. Additionally, the adhesive may not bond if the reinforcing steel is not satisfactorily cleaned, indicating that further cleaning of the steel may be needed.

Close proximity of the anode to a steel reinforcing member may increase galvanic activity (and hence "over-protection" protection) in the immediate vicinity of the sacrificial anode at the expense of activity and protection applied to more distant parts of the steel reinforcement. A non-conductive barrier may prevent a large amount of current from "dumping" directly into the reinforcing steel directly adjacent to a cathodic protection device. Such dumping is undesirable because it reduces the amount of current that flows to the reinforcing steel, for example, outside of a repair patch, where it is critically needed to prevent ongoing corrosion. Dumping of current to adjacent steel may also result in higher total current flow needlessly reducing the effective lifetime of the anode.

An anode may also passivate in service due to increased activity causing oxidation products to deposit faster than, for example, absorption, dissolution, or chelation mechanisms in the encasement material can convey them away. Spacing the anode apart from the steel may reduce the intensity of the protective current and reduce the tendency of the anode to passivate.

In accordance with certain embodiments, a non-conductive barrier positioned, for example, between the anode and the reinforcing steel, may reduce the peak current flow to adjacent areas of the steel and facilitate higher current areas in locations further away from the anode assembly mounting point This may provide an anode assembly that is more efficient overall.

In certain embodiments, an insulative spacer, or other non-conductive barrier, may extend some distance beyond the anode/steel contact area, for example, by a few centimeters. The anode may be placed within cathodic protective proximity of the reinforcing steel and may be separated from the steel by, for example, the furthest distance that allows the anode to satisfactorily protect the steel to which it is attached. The anode efficiency may be increased at long distances thus allowing greater separation between multiple anodes for cathodic protection of a structure using fewer anodes.

Aspects of the present disclosure are applicable to repairs where a section of existing concrete is excavated to expose the steel reinforcement and to arrangements which include the galvanic anode assembly and a discrete repair patch.

In certain embodiments, the anode assembly is embedded in the concrete and its installation is compatible with normal construction practices involved in concrete rehabilitation. These procedures may include excavation of damaged concrete down to a depth slightly below the steel reinforcement, attachment of the anode assembly to the steel reinforcement and back filling the excavated concrete area with a suitable embedding or repair mortar.

Many known galvanic anodes occupy an inconvenient amount of space in concrete repair configurations. According to certain illustrative embodiments, the sacrificial anode system of the present disclosure is shaped to conform to a short piece of reinforcing steel and may be positioned immediately adjacent to the reinforcing steel. This configuration optimizes the spacing achieved in congested repair areas and allows for a smaller and less costly concrete repair.

According to other illustrative embodiments, a method for reducing the corrosion of steel reinforcement in a concrete structure comprises providing a dual action sacrificial anode assembly of at least two sacrificial metals of different materials, each more electrochemically negative than steel. The anode may be at least partially covered in an encasement material. Elongated electrical conductors, tie wires, are connected to the anode body and emanate from the encasement material. The dual action anode assembly may be inserted into a hole formed in a concrete structure. An adhesive polymer spacer, for example and without limitation, pressure sensitive double-sided tape, is placed between the encasement material of the anode assembly and the surface of the steel reinforcement. The anode assembly is secured in place by winding the elongated electrical conductors around the steel reinforcement.

The secured anode assembly may be backfilled with a suitable low resistivity material such as certain cementitious repair mortars, often referred to in the art as embedment mortars. Alternatively, a low resistivity mortar may be used to encapsulate the secured anode assembly and then embedded within a high resistivity repair material so long as the low resistivity embedment mortar encapsulates the secured anode assembly and provides an ionically conductive path to the original concrete adjacent to the repair area.

As shown in FIG. 1A, the cathodic protection system 100 may include an anode assembly comprising an anode body 102 including a less sacrificial metal 106 and a more sacrificial metal 104. In certain embodiments, the anode body 102 may comprise a layer of a more sacrificial metal 104 sandwiched between two layers of a less sacrificial metal 106. In further embodiments, the anode body 102 may comprise a layer of a less sacrificial metal 106 sandwiched between two layers of a more sacrificial metal 104. The anode body 102 may be at least partially coated or covered with an encasement material 108. Elongated electrical conductors 116, 118 are connected to the anode body 102 and emanate from the encasement material 108. During installation, an insulative adhesive spacer 110 may be placed between the anode body 102 and the reinforcing steel 114. The insulative adhesive spacer 110 fastens the anode body 102 to the reinforcing steel 114. The insulative adhesive spacer 110 attaches the anode assembly 102 and holds the anode assembly in place while the electrical conductors 116, 118 are secured to the reinforcing steel 114 as shown.

As shown in FIG. 1B, the cathodic protection system 100 may include an anode assembly comprising an anode body 102 including a layer of a less sacrificial metal 106 and a layer of more sacrificial metal 104. In an embodiment, the more sacrificial metal 104 may be between the less sacrificial metal 106 and the reinforcing steel 114. The anode body 102 may be at least partially coated or covered with an encasement material 108. Elongated electrical conductors 116, 118 are connected to the anode body 102 and emanate from the encasement material 108. During installation, an insulative adhesive spacer 110 may be placed between the anode body 102 and the reinforcing steel 114. The insulative adhesive spacer 110 fastens the anode body 102 to the reinforcing steel 114. The insulative adhesive spacer 110 attaches the anode assembly 102 and holds the anode assembly in place while the electrical conductors 116, 118 are secured to the reinforcing steel 114 as shown.

Figure 2:
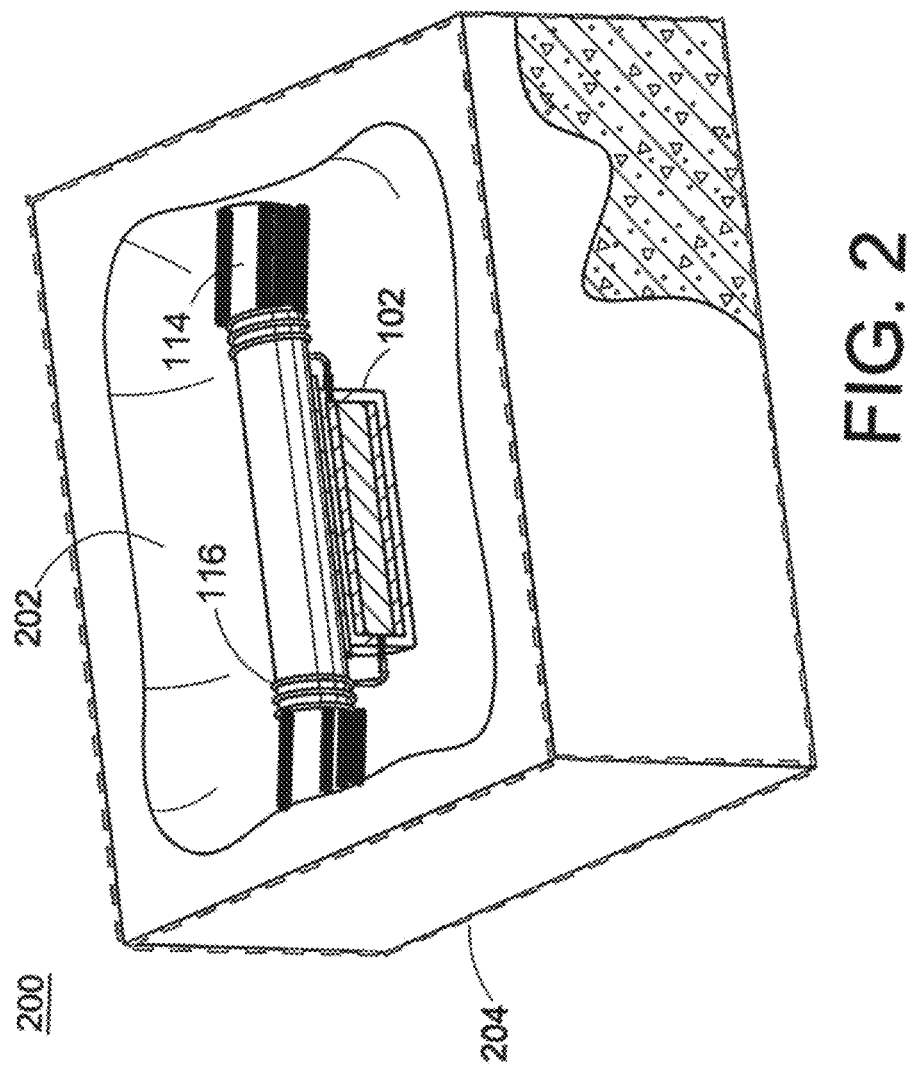
FIG. 2 shows a repair site in a reinforced concrete structure with an illustrative embodiment of a sacrificial anode embedded therein.

Turning to FIG. 2, the cathodic protection method 200 comprises forming a repair patch 202 in a steel reinforced concrete structure 204. The anode assembly 102 is affixed to the reinforcing metal with, for example, an adhesive spacer 110, and is secured to the reinforcing steel 114 with elongated electrical conductors 116, 118.

Figure 3A:
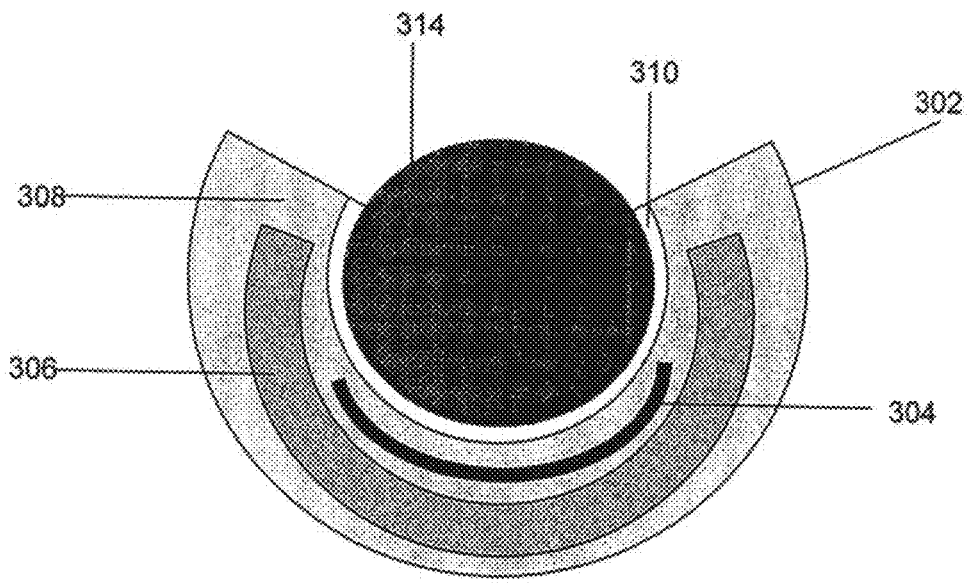
FIG. 3A is a cross sectional view of an illustrative embodiment of the galvanic cathodic protection system.

As shown in FIG. 3A, an illustrative cathodic protection system 300 may include an anode assembly comprising an anode body 302 including a less sacrificial metal 306 and a more sacrificial metal 304. The less sacrificial metal 306 may partially surround the more sacrificial metal 304. The anode body 302 may comprise a substantially cylindrical shape having, for example, a C-shaped, V-shaped or U-shaped recess extending essentially the length of one side of the anode body. The anode body 302 may be at least partially coated or covered with an encasement material 308. During installation, the anode body may be placed within cathodic protective proximity of the reinforcing steel 314 and an adhesive spacer 310 may be placed between the anode assembly 302 and the reinforcing steel 314. The adhesive spacer 310 may fasten the anode assembly 302 to the reinforcing steel 314 and hold the anode assembly in place.

Figure 3B:
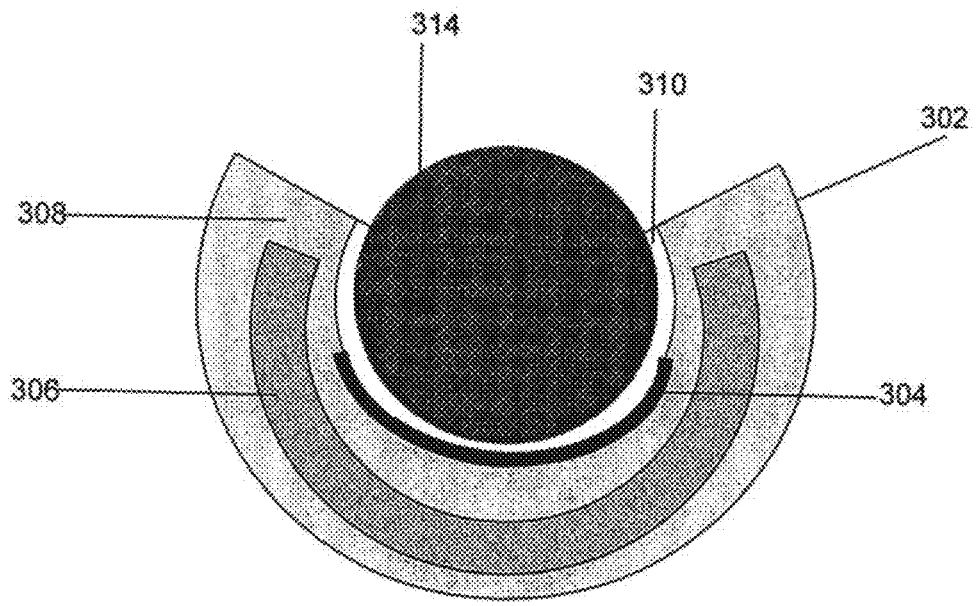
FIG. 3B is a cross sectional view of an illustrative embodiment of the galvanic cathodic protection system.

Turning now to FIG. 3B, an illustrative cathodic protection system 300 may include an anode assembly comprising an anode body 302 including a less sacrificial metal 306 and a more sacrificial metal 304. The less sacrificial metal 306 may partially surround the more sacrificial metal 304. The anode body 302 may comprise a substantially cylindrical shape having, for example, a C-shaped, V-shaped or U-shaped recess extending essentially the length of one side of the anode body. The anode body 302 may be at least partially coated or covered with an encasement material 308. In some embodiments, a less sacrificial metal 306 may be covered by an encasement material 308 and a more sacrificial metal 304 may be positioned in contact with the encasement material 308 and an adhesive spacer 310. In further embodiments, a less sacrificial metal may be covered with an encasement material 308, a more sacrificial metal 304 may be positioned between the outer surface of the encasement material 308 and an insulative adhesive spacer 310, with spacer 310 being in contact with the reinforcing steel 314. During installation, the anode body may be placed within cathodic protective proximity of the reinforcing steel 314 and an adhesive spacer 310 may be placed between the anode assembly 302 and the reinforcing steel 314. The adhesive spacer 310 may fasten the anode assembly 302 to the reinforcing steel 314 and hold the anode assembly in place.

The present disclosure overcomes the disadvantages of known impressed current cathodic protection systems as it does not require a power supply, extensive wiring or monitoring and overcomes the known sacrificial anode shortcomings of low current and reduced life span. The use of two sacrificial metals provides both higher current for the initial polarization of the reinforcing steel and then a longer lasting lower current to maintain cathodic protection. The initial polarization of the reinforcing steel by the more active metal tends to remove chloride ions and restore alkalinity in the vicinity of the protected reinforcing steel. The second sacrificial metal then merely needs to maintain these passive conditions thereby providing a dual action galvanic protection.

While the anode assembly, cathodic protection system and method have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the cathodic protection system and method should not be limited to any single embodiment, but rather construed in breadth and scope in accordance with the recitation of the appended claims.

The invention claimed is:

1. A sacrificial anode body comprising:
   a first sacrificial metal, wherein said first sacrificial metal comprises a perforated flat sacrificial metal rolled into a cylinder, and wherein said first sacrificial metal comprises magnesium or a magnesium alloy;
   a second sacrificial metal, said second sacrificial metal less electrochemically negative than said first sacrificial metal, and wherein said second sacrificial metal comprises a perforated, flat sacrificial metal rolled into a cylinder and formed around said first sacrificial metal, wherein said second sacrificial metal comprises zinc or a zinc alloy, and wherein said first sacrificial metal and said second sacrificial metal are more electrochemically negative than steel;
   an encasement material comprising a porous mortar surrounding said first and second sacrificial metals;
   an insulative adhesive spacer in contact with said encasement material and having a compressible adhesive capable of absorption of corrosion products from said first and/or second sacrificial metal; and
   at least one elongated electrical conductor electrically connected to said anode body, wherein said electrical conductor emanates from said encasement material.

2. The sacrificial anode body of claim 1, wherein said insulative adhesive spacer comprises a double-sided tape.

3. The sacrificial anode body of claim 1,
   wherein said anode body comprises a substantially cylindrical shape having a C-shaped recess extending essentially the length of one side of the anode body.

4. The sacrificial anode body of claim 3, wherein said insulative adhesive spacer comprises a double-sided tape.

5. An assembly for reducing the corrosion of steel reinforcement in a concrete structure comprising the sacrificial anode body of claim 1, wherein said
   at least one electrical conductor connects to said steel reinforcement.

6. The assembly for reducing the corrosion of steel reinforcement in a concrete structure of claim 5, wherein said insulative adhesive spacer comprises a double-sided tape.

7. The assembly for reducing the corrosion of steel reinforcement in a concrete structure of claim 5, wherein said encasement material is a porous mortar.

8. The assembly for reducing the corrosion of steel reinforcement in a concrete structure of claim 5,
   wherein said insulative adhesive spacer is located between and in contact with said steel reinforcement and said encasement material of said anode body.

9. The assembly for reducing the corrosion of steel reinforcement in a concrete structure of claim 8, wherein said insulative adhesive spacer comprises a pressure sensitive adhesive.

10. The assembly for reducing the corrosion of steel reinforcement in a concrete structure of claim 5, wherein said at least one electric conductor is a plurality of elongated metal conductors, wherein the elongated metal conductors are electrically connected to said anode assembly and emanate from opposing sides of said encasement material.

11. A method for reducing the corrosion of steel reinforcement in a concrete structure comprising:

electrically connecting the sacrificial anode body of claim 1 to steel reinforcement in a steel reinforced concrete structure.

12. The method for reducing the corrosion of steel reinforcement in a concrete structure of claim 11, further comprising:
inserting said anode body into a hole formed in said concrete structure.

13. The method of reducing the corrosion of steel reinforcement in a concrete structure of claim 12, further comprising:
positioning said sacrificial anode body in contact with said steel reinforcement.

14. The method of reducing the corrosion of steel reinforcement in a concrete structure of claim 13, further comprising:
positioning a pressure sensitive adhesive in contact with and between said sacrificial anode body and said steel reinforcement.

\* \* \* \* \*